United States Patent
Abbondio

[11] 3,711,208
[45] Jan. 16, 1973

[54] DOUBLE BEAM OPTICAL DENSITOMETER

[75] Inventor: Antonio Abbondio, Oetwil/Zurich, Switzerland

[73] Assignee: Ciba-Geigy AG, Basel, Switzerland

[22] Filed: March 30, 1971

[21] Appl. No.: 129,540

[30] Foreign Application Priority Data

April 2, 1970 Switzerland..........................4886/70

[52] U.S. Cl. ..................356/202, 356/205, 250/209, 250/219, 250/220
[51] Int. Cl........................G01n 21/06, G01n 21/22
[58] Field of Search ....356/202, 205, 206; 250/219 F

[56] References Cited

UNITED STATES PATENTS

| | | | |
|---|---|---|---|
| 2,146,904 | 2/1939 | McFarland et al. | 356/204 |
| 3,623,817 | 11/1971 | Celio | 356/179 |
| 3,528,749 | 9/1970 | Bowker | 356/204 X |
| 3,600,099 | 8/1971 | Schoeffel | 356/206 |

FOREIGN PATENTS OR APPLICATIONS

1,011,941   12/1965   Great Britain

*Primary Examiner*—Ronald L. Wibert
*Assistant Examiner*—Paul K. Godwin
*Attorney*—Pierce, Scheffler & Parker

[57] ABSTRACT

The invention relates to a densitometer in which the slope of the density curve is adjustable. The densitometer provides a rotatable grey wedge disc and a rotatable chopper disc disposed so that a measuring light beam can pass through both discs and an object to be subjected to measurement and a reference light beam can pass only through the chopper disc. Both beams then image on a photoelectric detector which feeds corresponding signals to a comparator. When a starting position on the rotatable grey wedge disc passes a predetermined point, a circuit is opened which permits the comparator to connect a counter to a counting pulse transmitter, provided also that a predetermined relationship, for example equality, exists between said signals. The pulse repetition rate of the counting pulse transmitter is preferably controlled in dependence upon the rotational speed of the chopper disc and the slope of the density curve can be varied by adjusting the ratio between the rotational speed of the grey wedge disc and the pulse repetition rate. Where the pulse repetition rate is dependent upon the speed of the chopper disc, this adjustment is effected by a variable speed gear between the discs.

14 Claims, 4 Drawing Figures

DOUBLE BEAM OPTICAL DENSITOMETER

The invention relates to densitometers. In one form of densitometer, a measuring beam and a reference beam are each derived from a light source and pass through an object the optical density of which is to be measured and a rotating grey wedge disc. The beams are periodically interrupted by a rotating chopper disc in such manner that they alternately fall on a photoelectric detector of which the electric output signals are applied in alternation to the two inputs of a comparator. At the same, the grey wedge disc, when in a predetermined angular position (hereinafter referred to as the starting position), connects a counter to a counting pulse transmitter and the comparator so as to read out the momentary state of the count when the two input signals to the comparator are equal.

Such densitometers are used particularly in the graphic and photo-processing trades and the results of their measurements are intended to be comparable. This requirement assumes that the so-called density curves of the several densitometers (the density curve defines the functional relationship between the measured and the corresponding absolute density values) have adjustable slopes. This is due to the fact that absolute density values are defined and determined by theoretical considerations without reference to parameters that are important in practice, such as the measuring angle, aging of certain parts of the densitometers and so forth. Conventional densitometers of the above specified type have the drawback that the slope of their density curves is not adjustable, so that these densitometers give true results only under ideal conditions of measurement.

It is among the objects of this invention to overcome this difficulty.

The invention therefore provides a double beam optical densitometer which includes a light source, a rotatable grey wedge disc, a rotatable light chopper disc, means for directing a measuring light beam from the light source through the rotating grey wedge and chopper discs and an object the optical density of which is to be measured onto a corresponding photosensitive means, means for directing a reference light beam from the light source through the chopper disc onto a corresponding photo-sensitive means, a comparator, means for directing signals derived from the two photo-sensitive means to the comparator, a counting pulse transmitter, means for selectively varying the ratio between the rotational speed of the grey wedge disc and the pulse repetition rate of the counting pulse transmitter, a counter, and means responsive to the rotation of the grey wedge disc for connecting the counter to the counting pulse transmitter when the grey wedge disc passes a predetermined angular position, the comparator serving to stop the counter when the input signals to it from the two photo-sensitive means have a predetermined relationship.

In a preferred embodiment of the invention the optical grey wedge disc and the chopper disc are driven by a common motor through a variable transmission gear and the chopper disc is the frequency-determining part of the counting pulse transmitter. The transmission gear is preferably stepless.

In the preferred embodiment of the invention the slope of the density curves can be easily adjusted by varying the transmission ratio of the gearing.

The invention will be hereinafter more particularly described with reference to an embodiment shown in the drawings, in which.

Figure 1:
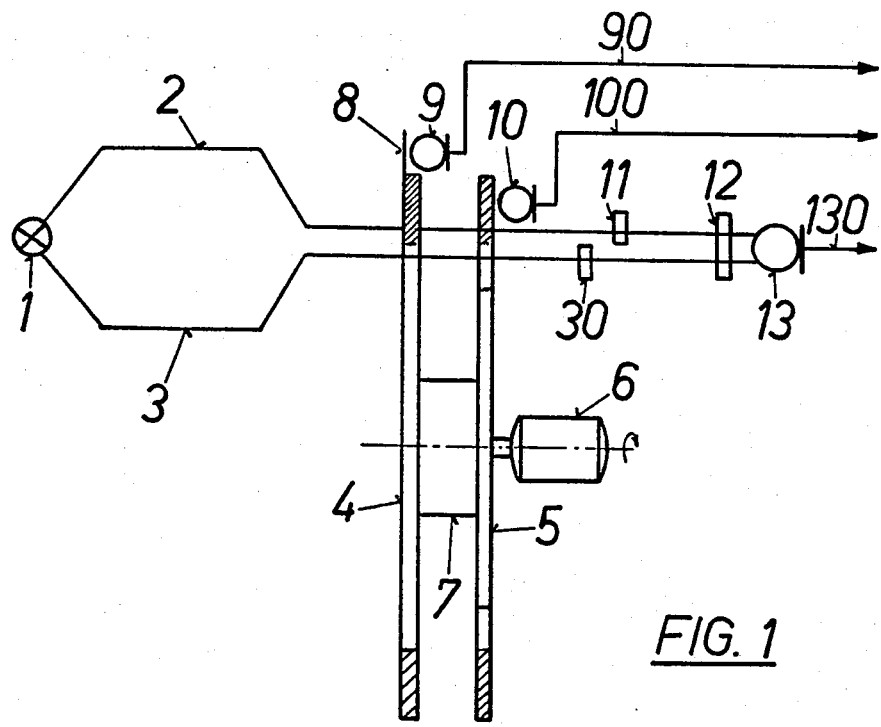
FIG. 1 is a schematic general representation of the proposed apparatus.

Referring first to FIG. 1, a light beam 2, that is to be used for density measurement, and a reference beam 3 are derived from a light source 1. The measuring light beam 2 passes through a disc-shaped stepless grey wedge 4, a chopper disc 5, the object 11 that is to be measured, and a color filter 12, finally falling on a photo-transducer 13. The reference beam 3 likewise passes through the chopper disc 5, an attenuator 30, such as a diaphragm or a grey wedge, and the color filter 12, also finally falling on the photo-transducer 13. In the drawing the grey wedge disc 4 precedes the chopper disc 5 in the path of the beams. It could equally well be located on the other side of the chopper disc 5. The color filter 12 is exchangeable and is preferably mounted so that it can be swung into and out of the paths of the beams. The filter may be for black and white, for the three primary colors red, blue and green or for any other colors that may be desired. The chopper disc 5 interrupts each beam alternately while allowing unimpeded passage of the other to the phototransducer 13.

The chopper disc 5 and the grey wedge disc 4 are both driven by a motor 6 through a common transmission gear 7, the chopper disc revolving $n$ times as fast as they grey wedge. The ratio of the transmission gear 7 is optically adjustable to vary the value of $n$. The chopper disc 5 simultaneously functions as a counting pulse transmitter, with the alternation between an open sector of the chopper disc and a following opaque sector in the direction of rotation being continuously detected by a photoelectric detector 10. The grey wedge 4 rotates in the direction of decreasing density and bears a mark 8 at the point of maximum density. Whenever the mark 8 passes through the beam of a second photoelectric detector 9 it gives rise to the generation of a starting pulse. The pulses or signals generated in the detectors 9 and 10 and the transducer 13 appear in the lines 90, 100 and 130 respectively and are then further processed in a circuit of the kind illustrated in FIG. 3.

Figure 2:
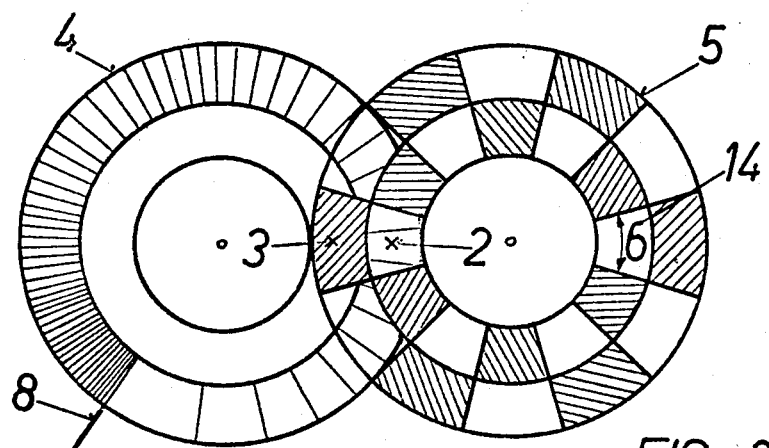
FIG. 2 is a modification of a detail of the apparatus shown in FIG. 1.

The grey wedge 4 and the chopper disc 5 may be coaxially disposed, as indicated in FIG. 1, or their axes of rotation may be relatively offset as shown in FIG. 2. In either case the two discs functionally cooperate in the same way. The measuring beam 2 and the reference beam 3, are understood to pass through the grey wedge 4 and the chopper disc 5 shown in FIG. 2 in a direction normal to the plane of the paper. The reference beam 3 continuously passes through a region of the grey wedge which is fully transparent, that is which has zero density, whereas the measuring beam 2 traverses the calibrated density region of the grey wedge 4, which embraces a density range from say 0 to 3.6. The chopper disc comprises transparent and opaque sectors arranged in an outer and in an inner annulus, the outer annulus chopping the reference beam 3 and the inner annulus the measuring beam 20. The sectors of the two annuli are alternately disposed that one beam is interrupted while the other is unimpeded. In the position illustrated in FIG. 2 the reference beam 3 is intercepted, whereas the measuring beam 2 can pass through.

In the illustrated embodiment, since each annulus of the chopper disc 5 is divided into 12 sectors and each measuring step requires a measuring and a reference signal, the illustrated arrangement would in practice be equivalent to a subdivision of the grey wedge disc into six density stages, assuming that the grey wedge 4 and the chopper revolved at the same speed. Hence the above assumed density range of up to a maximum density of 3.6 would provide a power of resolution of 0.6. However, if the chopper disc 5 is rotated at $n$ times the speed of the grey wedge disc 4, then two complementary surfaces on the grey wedge and chopper discs will register only for $1/n$th of the period of register when the spreads of grey wedge and chopper are equal. In effect this is equivalent to a reduction of the average width $b$ of each sector to $b/n$. Hence there is an $n$-fold increase in resolving power. In the illustrated example the resolution within the assumed density range would therefore be $0.6/n$.

Figure 3:
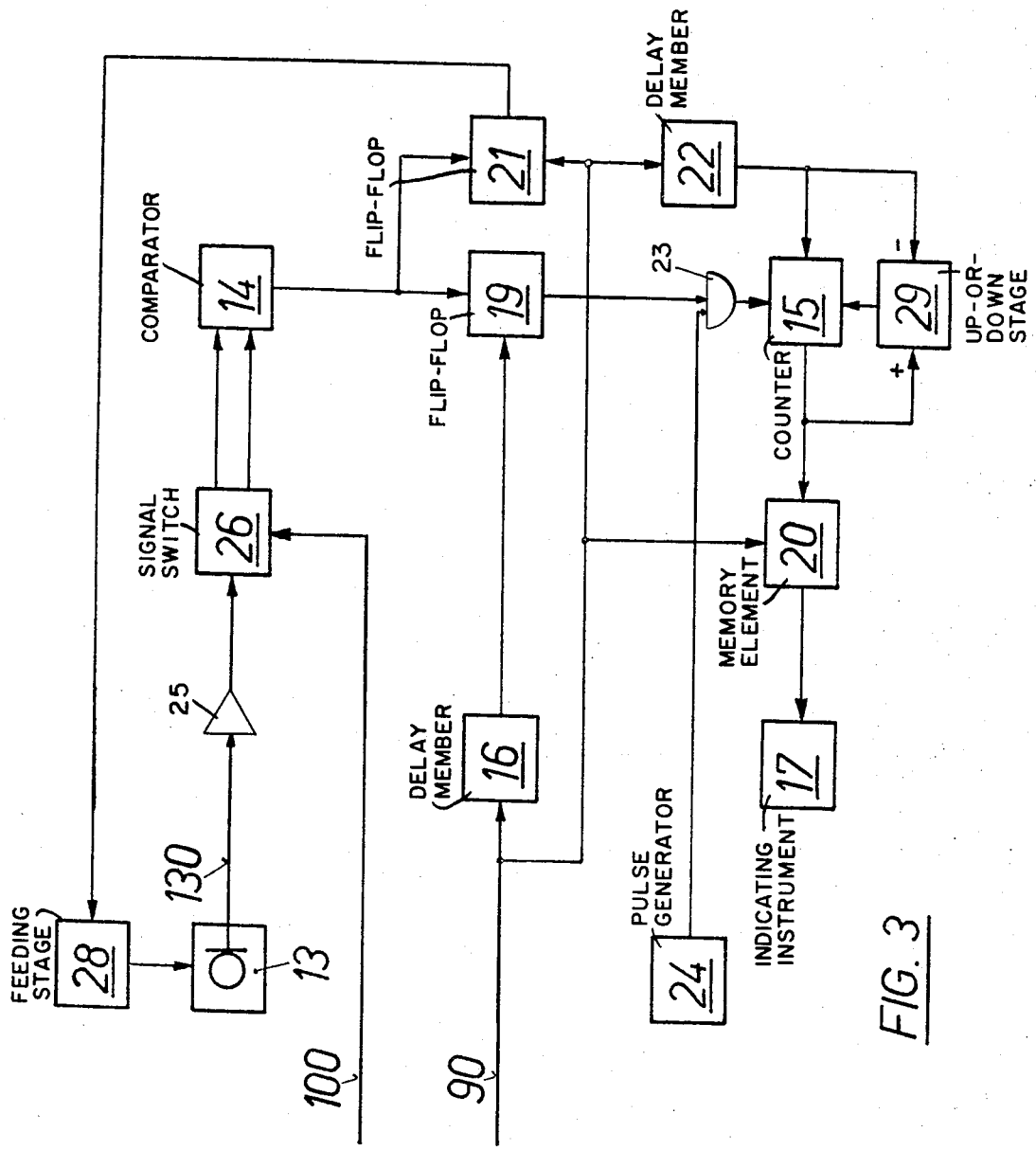
FIG. 3 is a preferred form of the electronic measuring circuit.

Referring to FIG. 3, the starting pulse generated by the photoelectric detector 9 at each revolution of the grey wedge disc 4 (FIG. 1) is applied via line 90, to a first delay member 16, a memory element 20, a first flip-flop 21 and a second delay member 22. The first delay member 16 permits the densitometer to be zeroed by an independent variation of the delay for each of the three colors or filter settings and for black and white for the purpose of eliminating the influence of the density of the base supporting the object to be measured.

The delayed starting pulse from the first delay member 16 operates a second flip-flop 19 so as to open a gate 23 which admits the counting pulses produced by a pulse transmitter in the form of a generator 24 to a counter 15 for adding these pulses. The frequency of the pulse generator 24 is determined by the rotational speed of the chopper disc 5. At the same time, the starting pulse from line 90 directly operates the first flip-flop 21 and thereby activates a stage 28 for feeding the photoelectric element 13. Moreover, the starting pulse causes the memory element 20 to store and an associated instrument 17 to indicate the state of the count recorded by counter 15 from the preceding measurement. After the final measurement of a series, or at the end of an individual measurement, the grey wedge disc is rotated for at least one revolution in order to generate a starting pulse for transferring the state of the count to the memory element 20 and instrument 17. The starting pulse is also applied via the second delay member 22 to the counter 15 and an up-or-down stage 29. This causes the counter 15 to be set to a particular number. At the same time the counter 15 is so controlled by the up-or-down stage 29 that it will count down towards zero when counting begins. The counter 15 remains at the pre-set number until the delayed starting pulse has connected the pulse generator 24 to the counter by opening the gate 23. At this instant the counter 15 starts counting, and under the control of the up-or-down stage 29, it counts down from the pre-set number towards zero. When the count-down reaches zero, the counter 15 applies a pulse to the up-or-down stage which switches the counter back to forward counting. The delay member 22 ensures that the counter will not be pre-set until the state of the count has been transferred to the indicating instrument.

The measuring and reference beams which the chopper alternately passes to the photo-transducer 13, generate signals in the transducer which are applied through a line 130 via an amplifier 25 to a signal switch 26. This signal switch 26 is controlled by the photoelectric detector 10 (FIG. 1) through a line 100 and thus operates in synchronism with the alternation of the measuring and reference beams falling on the detector 13, so that the signals sequentially leaving the amplifier will be divided by the switch 26 between two lines; a measuring line and a reference line which apply them to a comparator 14. The photoelectric detector 10 and the photo-transducer 13 may possibly share certain components.

The time constant of the comparator 14 is so chosen that upon arrival at one input of a signal generated by the measuring beam, a signal due to the reference beam will still be present at the other input. When these two signals are equal the comparator 14 produces a signal resetting the flip-flop 19 and closing the gate 23, causing the counter 15 to be arrested at the momentary position of the count. At the same time this control signal also resets the flip-flop 21 so that the photo-transducer 13 ceases to be supplied from stage 28. The transducer is thus protected from damage resulting from the increase in intensity of the measuring beam due to the grey wedge disc rotating in the direction of decreasing density.

In order to eliminate the dependence of the constancy of the frequency of the counting pulses upon the synchronous speed of rotation of the grey wedge disc, the pulse generator 24 may be replaced by a digital generator-comparator of the kind known in digital computer technology, which couples the selected frequency of the counting pulses with the speed of rotation of the grey wedge by digital frequency mixing.

In the illustrated densitometer it would naturally be possible for the reference beam 3 instead of the measuring beam to be modulated by the grey wedge. However, this would entail the drawback that the intensity of the reference beam at the photoelectric element 13 would continually fluctuate between two extremes, whereas in the illustrated arrangement it is constant. The attenuator 30 is so adjusted that the intensity of the reference beam at the input of the photoelectric element 13 is exactly equal to the intensity of the measuring beam when this passes through the zone of maximum density of the grey wedge disc. Since the measuring beam passes through the grey wedge as well as through the measured object the measuring signal at the input of the photoelectric element consists of a constant component deriving from the measured object and a component which, due to the direction of rotation of the grey wedge, linearly rises. When the signals due to the measuring beam and the reference beam are equal in the comparator, the required density of the object will be equal to the known density signal of the reference beam less the density signal of that part of the grey wedge disc 4 which at that instant happens to be in the path of the reference beam, the latter density being directly determinable because the density distribution on the grey wedge is a function of the pulse count.

Figure 4:
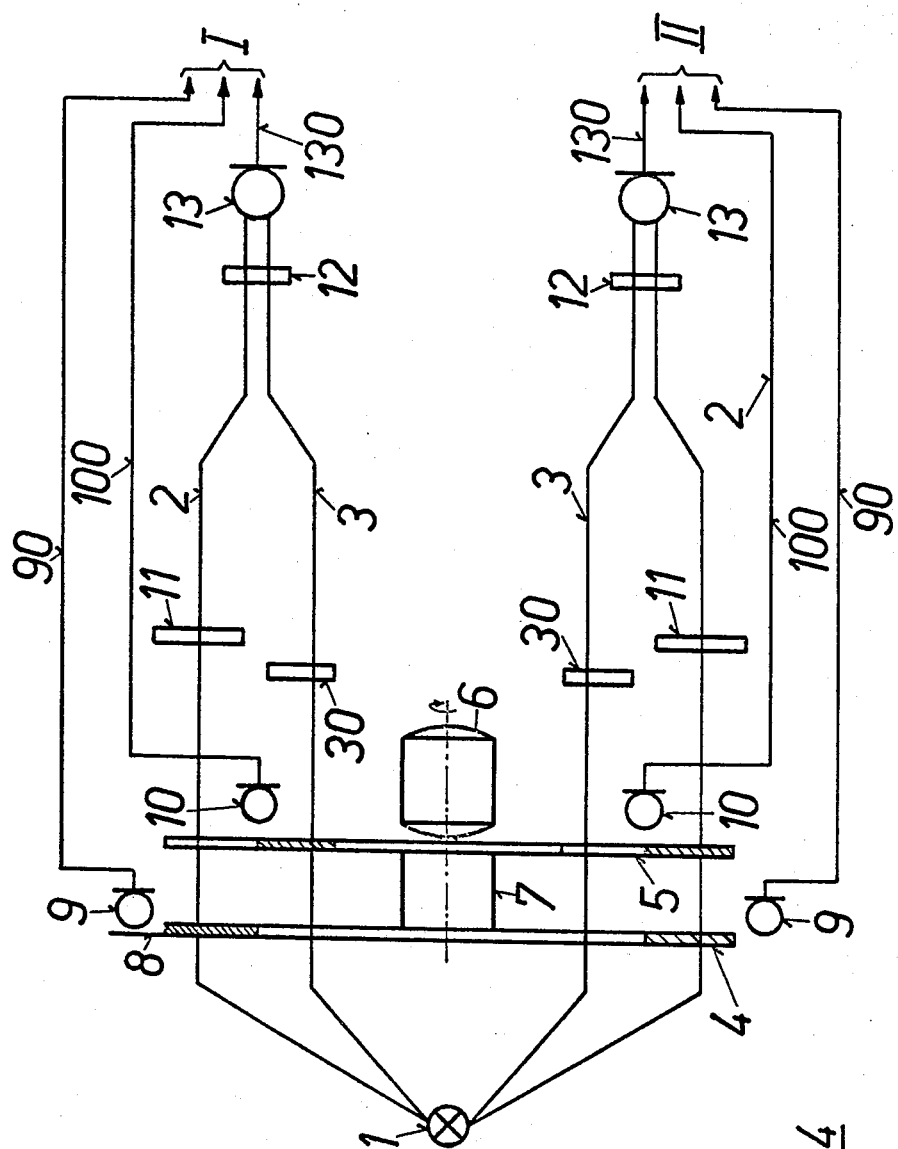
FIG. 4 is a schematic representation of a further development of the apparatus according to FIG. 1 in the form of a multiple densitometer.

In the apparatus of FIG. 4 several systems of light beams are obtained from a single light source 1 for simultaneously measuring several objects 11, the number of systems corresponding to the number of objects and each system comprising a measuring beam 2 and a reference beam 3. The drawing shows two such systems I and II. Common to all the systems are the light source 1, a grey wedge disc 4 with a starting mark 8, a chopper 5, a motor 6 and a transmission gear 7. Each system comprises a separate photoelectric detector 10 at the chopper disc 5, separate color filters 12 and a separate photoelectric element 13. Moreover, each system comprises a separate measuring circuit according to FIG. 3. Only the independent pulse generator 24 and possibly the photoelectric pick-up for generating the starting pulse may be common to all systems.

Since the several independent measuring beams traverse the grey wedge disc at different points the starting pulse which initiates the count, and which is produced by the response of the photoelectric pick-up 9 to the passage of the mark 8, appears at a different time in each system. However, the use of appropriate delay circuits permits the several starting signals to be generated by one common starting pulse. The pulse generator 24 which continuously runs during a measurement is connected in each system to the counter 15 of the system when the relative starting pulse appears. The several measuring and reference beams may be transmitted through light conductors.

The principal feature of the illustrated instruments resides in the capacity to selectively adjust the slope of the density curve by appropriately adjusting the ratio of the speed of rotation of the grey wedge disc to the frequency of the counting pulses. In the instruments illustrated in FIGS. 1 and 4, this is done by varying the speed of the chopper disc which functions as a counting pulse transmitter, whereas the speed of the grey wedge disc remains constant. It is also possible to drive the chopper disc at a uniformly constant speed and to apply the counting pulses derived therefrom to the counter via a frequency multiplier having a controllably variable output frequency or providing an adjustable frequency multiplication. A third possibility is indicated in FIG. 3 and consists in rotating the grey wedge disc and the chopper disc at synchronous constant speeds and generating the counting pulses by an independent pulse generator producing a controllably variable pulse frequency.

I claim:

1. An optical densitometer, comprising:
   a light source;
   a rotatable grey wedge disc;
   a rotatable chopper disc;
   means for rotating said grey wedge disc and said chopper disc;
   photo-sensitive means producing signals representative of light falling thereon;
   means for directing a measuring light beam from said light source through said grey wedge and chopper discs, and an object, the optical density of which is to be measured, onto said photo-sensitive means;
   means for directing a reference light beam from said light source through said chopper disc and onto said photo-sensitive means;
   said rotatable chopper disc alternately intercepting said light beams;
   a comparator;
   means for directing signals derived from said photo-sensitive means and representative of the intensities of said light beams to said comparator;
   a counting pulse transmitter;
   means for selectively varying the ratio between the rotational speed of the grey wedge disc and the pulse repetition rate of the counting pulse transmitter;
   a counter; and
   means responsive to the rotation of the grey wedge disc for connecting the counter to the counting pulse transmitter when said grey wedge disc passes a predetermined angular position, said comparator stopping said counter when the input signals to the comparator have a predetermined relationship.

2. An optical densitometer as claimed in claim 1, wherein said means for rotating comprises a motor and a variable transmission gear, said transmission gear drivingly connecting said motor to said grey wedge and chopper discs.

3. An optical densitometer as claimed in claim 2, wherein the variable transmission gear is infinitely variable.

4. An optical densitometer as claimed in claim 1, wherein the frequency of the counting pulse transmitter is determined by the rotational speed of the chopper disc, each alternation between an open sector of the chopper disc and a following opaque sector in the direction of movement producing a counting pulse of the counting pulse transmitter.

5. An optical densitometer as claimed in claim 1, wherein the counting pulse transmitter comprises an independent pulse generator and wherein the ratio of the rotational speeds of the grey wedge and chopper discs is constant and wherein there is interposed between the pulse generator and the counter means for selectively varying the frequency of the pulse generator, said means comprising a frequency multiplier and a frequency mixer.

6. An optical densitometer as claimed in claim 1, wherein the counting pulse transmitter comprises an independent pulse generator and wherein the ratio of the rotational speeds of the grey wedge and chopper discs is constant and wherein the pulse frequency of the pulse generator is independently variable.

7. An optical densitometer as claimed in claim 1, comprising a light attenuator disposed in the path of the reference beam, said attenuator being so adjusted that the intensities of the measuring and reference beams, subsequent to passing through the maximum density zone of the grey wedge disc and attenuator respectively, are the same.

8. An optical densitometer as claimed in claim 1, wherein said grey wedge disc activates said photo-sensitive means when passing said angular position and wherein means responsive to the comparator deactivate the photo-sensitive means when the input signals thereto are equal.

9. An optical densitometer as claimed in claim 1, comprising a starting pick-off positioned adjacent to said grey wedge disc, an AND-gate connected between the starting pick-off and the counter and a variable delay stage connected between the starting pick-off and the AND-gate, said starting pick-off being responsive to the passage of the predetermined angular position on said grey wedge disc to actuate said AND-gate and connect the counting pulse transmitter to the counter.

10. An optical densitometer as claimed in claim 9, wherein said starting pick-off comprises a photo-electric detector, and wherein said grey wedge disc includes a mark mounted on said disc at the transition point between the zones of maximum and minimum density, said mark defining said angular position.

11. An optical densitometer as claimed in claim 1, comprising an indicating instrument and means responsive to the passage of said grey wedge disc past said predetermined angular position for transferring the count recorded by the counter to said indicating instrument.

12. An optical densitometer comprising:
a rotatable grey wedge disc;
a rotatable chopper disc;
means for rotating said grey wedge disc and said chopper disc;
at least one light source;
a plurality of photoelectric elements;
means for directing each of a same plurality of measuring light beams from a light source through said optical wedge and chopper discs and through one of a same plurality of objects to be subjected to density measurement onto one of said photo-electric elements;
means for directing each of a same plurality of reference light beams from the same light source through said chopper disc and onto the corresponding photoelectric element;
said rotatable chopper being adapted to alternately intercept each light beam in each pair of measuring and reference light beams;
a same plurality of comparators;
means associated with each photoelectric element for directing separate signals representative of the intensity of the corresponding light beams to one of said comparators;
counting pulse transmitter means;
means for selectively varying the ratio between the rotational speed of the grey wedge disc and the number of pulses generated by the counting pulse transmitter means;
a plurality of counters, and;
means responsive to the rotation of the grey wedge disc for connecting each counter to the counting pulse transmitter means when said grey wedge disc passes a predetermined angular position, each comparator stopping the corresponding counter when the input signals thereto have a predetermined relationship.

13. An optical densitometer as claimed in claim 12, wherein said counting pulse transmitter means comprises a single pulse generator.

14. An optical densitometer as claimed in claim 13, comprising a same plurality of starting pick-offs positioned adjacent to said optical wedge disc, a same plurality of AND-gates connected between the starting pick-offs and the corresponding counters, and a same plurality of variable delay stages connected between the corresponding starting pick-offs and AND-gates; the variable delay stages being so set that each corresponding counter is connected to the counting pulse generator at the time coinciding with the activation of the corresponding pick-off by the passage of a predetermined position on the optical wedge disc.

* * * * *